US011120221B2

United States Patent
Sainani et al.

(10) Patent No.: US 11,120,221 B2
(45) Date of Patent: Sep. 14, 2021

(54) METHOD AND SYSTEM TO RESOLVE AMBIGUITIES IN REGULATIONS

(71) Applicant: Tata Consultancy Services Limited, Mumbai (IN)

(72) Inventors: Abhishek Sainani, Pune (IN); Smita Subhash Ghaisas, Pune (IN); Preethu Rose Anish, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 211 days.

(21) Appl. No.: 16/365,344

(22) Filed: Mar. 26, 2019

(65) Prior Publication Data
US 2020/0311201 A1    Oct. 1, 2020

(51) Int. Cl.
| | |
|---|---|
| *G06F 17/00* | (2019.01) |
| *G06F 40/279* | (2020.01) |
| *G06N 3/08* | (2006.01) |
| *G06Q 30/00* | (2012.01) |

(52) U.S. Cl.
CPC ............. *G06F 40/279* (2020.01); *G06N 3/08* (2013.01); *G06Q 30/018* (2013.01)

(58) Field of Classification Search
CPC ....... G06F 40/279; G06N 3/08; G06Q 30/018
See application file for complete search history.

(56) References Cited

U.S. PATENT DOCUMENTS

| | | | |
|---|---|---|---|
| 6,189,002 B1 | 2/2001 | Roitblat | |
| 9,262,406 B1 | 2/2016 | Das et al. | |
| 10,452,784 B1* | 10/2019 | Walters | ................... G06F 40/44 |
| 2006/0224532 A1* | 10/2006 | Duan | ....................... G06N 3/08 |
| | | | 706/15 |

(Continued)

OTHER PUBLICATIONS

Pesaranghader, A. et al. (Feb. 25, 2018). "One Single Deep Bidirectional LSTM Network for Word Sense Disambiguation of Text Data," retrieved from https://arxiv.org/pdf/1802.09059.pdf; 12 pages.

(Continued)

*Primary Examiner* — Mohammed H Zuberi
(74) *Attorney, Agent, or Firm* — Finnegan, Henderson, Farabow, Garrett & Dunner, LLP

(57) ABSTRACT

Resolving ambiguities in regulatory documents is necessary to ensure organizations and people are able to be best possible compliant with regulations or standards. Current approaches attempting to automatically resolve ambiguities in regulatory documents have limitations when it comes to incorporating fairness or reduce chances of subjective interpretation. Embodiments of the present disclosure provide a method and system for automatically resolving ambiguities in regulations. To disambiguate a given regulatory sentence the method augments the regulation sentence with relevant internal information extracted using a set of predefined linguistic patterns and relevant external information extracted from external sources identified using a Neural Network (NN) model. The augmented text comprising the regulation sentence, the relevant internal information and the summarized relevant external information enables the end user to make an informed interpretation of the regulation sentence and resolve ambiguity present in the regulation sentence.

9 Claims, 2 Drawing Sheets

(56) References Cited

U.S. PATENT DOCUMENTS

| | | | |
|---|---|---|---|
| 2011/0161267 A1* | 6/2011 | Chowdhary | G06N 3/08 706/21 |
| 2012/0323833 A1* | 12/2012 | Markram | G06N 3/082 706/27 |
| 2015/0142682 A1 | 5/2015 | Ghaisas et al. | |
| 2017/0213129 A1* | 7/2017 | Lee | G06N 3/04 |
| 2017/0213469 A1 | 7/2017 | Elchik et al. | |
| 2017/0360351 A1* | 12/2017 | Unni | A61B 5/0205 |
| 2018/0239507 A1* | 8/2018 | Bui | G06F 16/345 |
| 2018/0347763 A1* | 12/2018 | Ford | G06N 3/08 |
| 2019/0033085 A1* | 1/2019 | Ogale | G06N 3/0454 |
| 2019/0034794 A1* | 1/2019 | Ogale | G01C 21/3407 |
| 2020/0058307 A1* | 2/2020 | Steelberg | G10L 15/02 |
| 2020/0066278 A1* | 2/2020 | Steelberg | G06F 40/284 |
| 2020/0075019 A1* | 3/2020 | Steelberg | G10L 15/1815 |
| 2020/0089623 A1* | 3/2020 | Chen | G06N 3/063 |
| 2020/0090024 A1* | 3/2020 | Chen | G06F 13/28 |
| 2020/0125107 A1* | 4/2020 | Schlicht | G06F 21/6218 |
| 2020/0158773 A1* | 5/2020 | Hong | G06N 3/0454 |
| 2020/0176121 A1* | 6/2020 | Dalal | G16H 50/30 |
| 2020/0184330 A1* | 6/2020 | Walters | G06N 3/0454 |
| 2020/0184584 A1* | 6/2020 | Farivar | G06N 3/08 |
| 2020/0245913 A1* | 8/2020 | Dalal | G16H 50/50 |
| 2020/0311201 A1* | 10/2020 | Sainani | G06F 40/279 |
| 2020/0312163 A1* | 10/2020 | Durr | G06T 7/20 |
| 2020/0334772 A1* | 10/2020 | Gorodeisky | G06Q 50/182 |
| 2020/0401879 A1* | 12/2020 | Menard | G06F 16/953 |
| 2021/0034986 A1* | 2/2021 | House | G06N 3/10 |
| 2021/0080966 A1* | 3/2021 | Tran | G06N 3/08 |

OTHER PUBLICATIONS

Nguyen, H.L. (2017). *Named Entity Recognition Using Recurrent Neural Networks* (Bachelor Project Assignment). Retrieved from https://dspace.cvut.cz/bitstream/handle/10467/69368/F3-BP-2017-Nguyen-Hoang Long-thesis.pdf; 59 pages.

Chen, X. et al. "Joint Learning of Character and Word Embeddings," *Proceedings of the 24th International Joint Conference on Artificial Intelligence (IJCAI 2015)*, Buenos Aires, Argentina, Jul. 25-31, 2015; pp. 1236-1242.

\* cited by examiner

METHOD AND SYSTEM TO RESOLVE AMBIGUITIES IN REGULATIONS

TECHNICAL FIELD

The disclosure herein generally relates to text processing and analysis, and, more particularly, to method and system for automatically resolving ambiguities in regulations.

BACKGROUND

Compliance to regulations such as General Data Protection Regulation (GDPR), ISO 27001, US Health Insurance Portability and Accountability Act (HIPAA) and the like is mandatory. Non-compliance to these regulations can have serious consequences and make severe impact on organization and individuals. Rightly understanding or interpreting each and every sentence in the regulations or regulatory documents is critical to ensure compliance. However, regulations are ambiguous due to the structure of sentences in these regulations and also the semantics. This is mainly due to the use of legalese language. Further, conventional process of deriving requirements for compliance is ad hoc and error prone, as it mostly involves manual intervention for analyzing and interpreting the regulatory documents. Presence of ambiguities in regulations is one of the main reason of mislead interpretations, which often are unintentional. This issue of misinterpretation creeps in as interpretation is subjective, based on interpreter's expertise and additional relevant information at hand. Often, the interpretation of the regulation sentences is based on the context/situation in which the regulation is to be applied. Thus, organizations that must adhere to the regulations often fail to prevent breaches, as a result, regulations are increasingly seen to be subject to misuse, abuse and violation. Often, violation of a regulations is accidental due to ambiguity present in the regulation.

Possibility of deriving multiple interpretations by a user, which exists due to the ambiguities in the regulatory, can be resolved if the regulation sentence is associated or linked with additional relevant text for clear and better interpretation. Potential breaches in regulation compliance can be eliminated by disambiguation of the regulation text. Current approaches attempting to automatically resolve ambiguities in regulatory documents have limitations when it comes to incorporating fairness or reduce chances of subjective interpretation. In highly regulated and ubiquitous domains such as healthcare, this becomes all the more critical.

Thus, automating the process of resolving ambiguities in the regulatory documents remains a challenge.

SUMMARY

Embodiments of the present disclosure present technological improvements as solutions to one or more of the above-mentioned technical problems recognized by the inventors in conventional systems. For example, in one aspect, there is provided a processor implemented method to resolve ambiguities in regulatory documents. The method comprises receiving a regulation sentence corresponding to a regulatory document among a plurality of regulatory documents. Further the method comprises extracting relevant internal information related to the regulation sentence by analyzing the regulatory document in accordance with a set of predefined linguistic patterns. The predefined linguistic patterns are generated for a plurality of aspects of the regulation document comprising an amendment, an applicability, a definition and a reference. Further, the method comprises extracting relevant external information related to the regulation statement from external information using a Neural Network (NN) model to provide binary traceability. The NN model is trained using a source artifact comprising regulation sentences in a plurality of regulatory documents and a target artifact comprising the external information. Further, the relevancy of the external information with the regulation sentence is accessed by the NN model based on a similarity score threshold. Furthermore, the method comprises summarizing the relevant external information using an information summarization technique. Furthermore, the method comprises generating an augmented text for the regulation sentence to resolve the ambiguity associated with the regulation sentence. The augmented text comprises the regulation sentence, the relevant internal information and the summarized relevant external information, wherein the augmented text enables the end user to make an informed interpretation of the regulation sentence and resolve ambiguity present in the regulation sentence.

In another aspect, there is provided a system for resolving ambiguities in regulatory documents. The system comprises a memory storing instructions; one or more Input/Output (I/O) interfaces; and a processor coupled to the memory via the one or more I/O interfaces, wherein the processor is configured by the instructions to receive a regulation sentence corresponding to a regulatory document among a plurality of regulatory documents. Further the processor is configured to extract relevant internal information related to the regulation sentence by analyzing the regulatory document in accordance with a set of predefined linguistic patterns. The predefined linguistic patterns are generated for a plurality of aspects of the regulation document comprising an amendment, an applicability, a definition and a reference. Further, the processor is configured to extract relevant external information related to the regulation statement from external information using a Neural Network (NN) model to provide binary traceability. The NN model is trained using a source artifact comprising regulation sentences in a plurality of regulatory documents and a target artifact comprising the external information. Further, the relevancy of the external information with the regulation sentence is accessed by the NN model based on a similarity score threshold. Furthermore, the processor is configured to summarize the relevant external information using an information summarization technique. Furthermore, the processor is configured to generate an augmented text for the regulation sentence to resolve the ambiguity associated with the regulation sentence. The augmented text comprises the regulation sentence, the relevant internal information and the summarized relevant external information, wherein the augmented text enables the end user to make an informed interpretation of the regulation sentence and resolves ambiguity present in the regulation sentence.

In yet another aspect, there are provided one or more non-transitory machine readable information storage mediums comprising one or more instructions which when executed by one or more hardware processors causes a method for resolving ambiguities in regulatory documents. The method comprises receiving a regulation sentence corresponding to a regulatory document among a plurality of regulatory documents. Further the method comprises extracting relevant internal information related to the regulation sentence by analyzing the regulatory document in accordance with a set of predefined linguistic patterns. The predefined linguistic patterns are generated for a plurality of aspects of the regulation document comprising an amendment, an applicability, a definition and a reference. Further, the method comprises extracting relevant external information related to the regulation statement from external information using a Neural Network (NN) model to provide binary traceability. The NN model is trained using a source artifact comprising regulation sentences in a plurality of regulatory documents and a target artifact comprising the external information. Further, the relevancy of the external information with the regulation sentence is accessed by the NN model based on a similarity score threshold. Furthermore, the method comprises summarizing the relevant external information using an information summarization technique. Furthermore, the method comprises generating an augmented text for the regulation sentence to resolve the ambiguity associated with the regulation sentence. The augmented text comprises the regulation sentence, the relevant internal information and the summarized relevant external information, wherein the augmented text enables the end user to make an informed interpretation of the regulation sentence and resolve ambiguity present in the regulation sentence.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a component of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide a method and system for automatically resolving ambiguities in regulations, alternatively referred as regulatory documents. An automated approach to disambiguate a given regulatory sentence by integrating or augmenting relevant internal information and a summarized external relevant information is provided. To extract the relevant internal information the method disclosed analyzes a regulatory document corresponding to the regulation sentence in accordance with a set of predefined linguistic patterns. To extract the relevant external information the method disclosed analyzes external information crawled for a plurality of external sources using a Neural Network (NN) model. The NN model is trained using a source artifact comprising regulation sentences in a plurality of regulatory documents and a target artifact comprising the external information.

The NN model attempts to bring in human interpretation angle while extracting the relevant external information, but considerably reduces chances of subjective analysis which is inherent to actual human interpretation. The NN model emulates human cognitive process of looking at additional information from other internal and external sources for disambiguation in a focused way by referring only to authorized sources for augmenting the understanding. Thus, an augmented text comprising the regulation sentence, the relevant internal information and the summarized relevant external information enables the end user to make an informed interpretation of the regulation sentence and resolves ambiguity present in the regulation sentence.

The method disclosed, even though is explained in accordance with explicit mention of regulatory documents, it is to be understood that the method can be applied to analyze any text documents that may inherently have ambiguities. For example, various laws etc.

Figure 1:
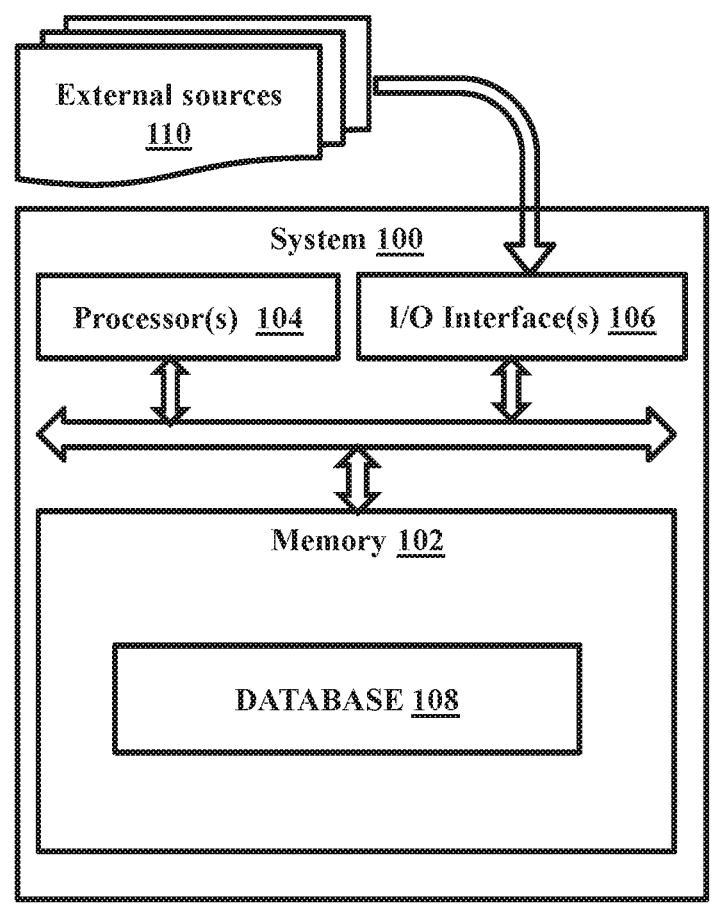
FIG. 1 illustrates an exemplary block diagram of a system for automatically resolving ambiguities in regulations, in accordance with an embodiment of the present disclosure.
Figure 2:
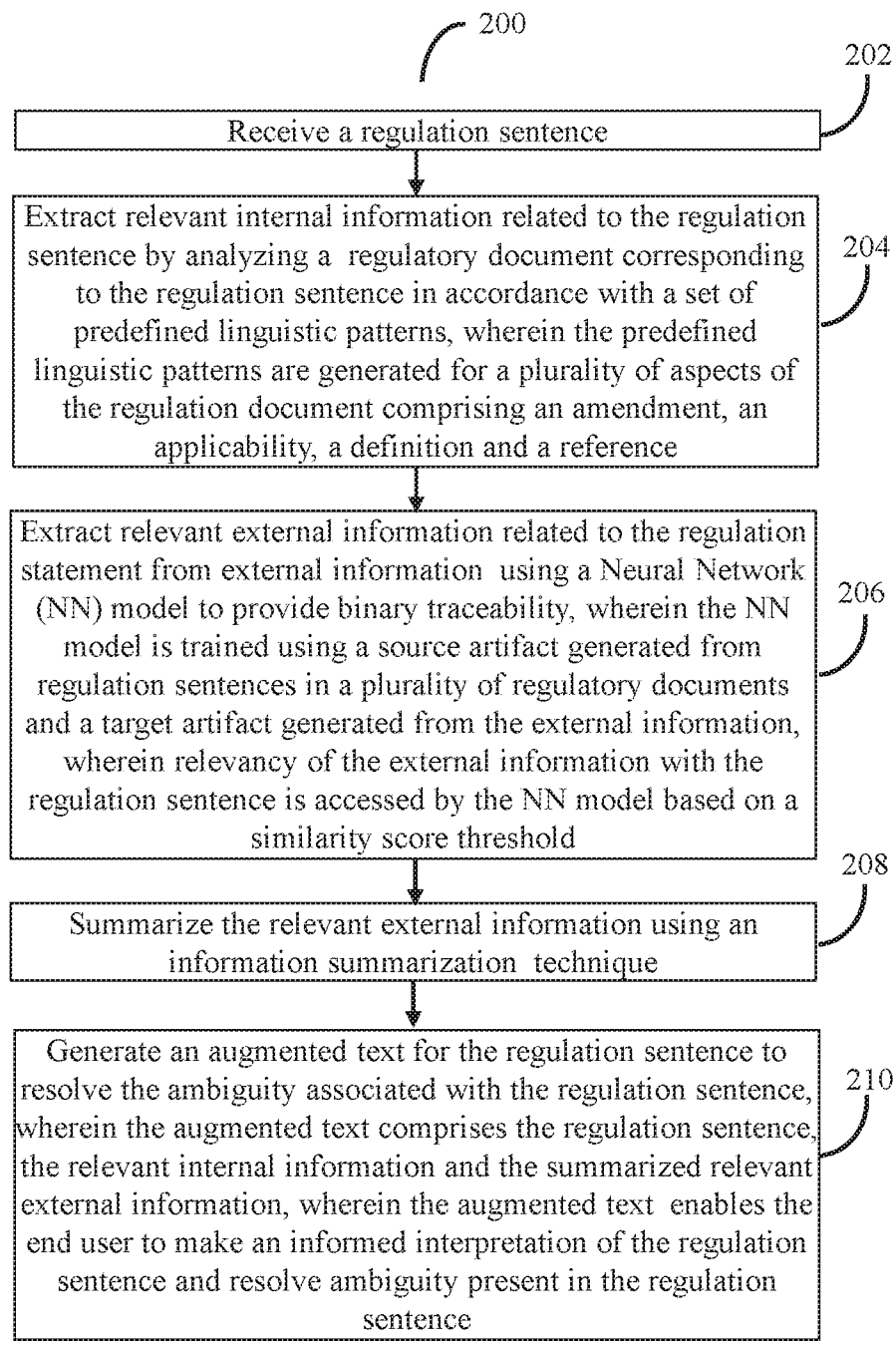
FIG. 2 illustrates an exemplary flow diagram of a method for automatically resolving ambiguities in regulations using the system of FIG. 1, in accordance with an embodiment of the present disclosure.

Referring now to the drawings, and more particularly to FIG. 1 and FIG. 2, where similar reference characters denote corresponding features consistently throughout the figures, there are shown preferred embodiments and these embodiments are described in the context of the following exemplary system and/or method.

FIG. 1 illustrates an exemplary block diagram of a system 100 for automatically resolving ambiguities in regulations, in accordance with an embodiment of the present disclosure.

In an embodiment, the system 100 includes processor (s) 104, communication interface device(s), alternatively referred as or input/output (I/O) interface(s) 106, and one or more data storage devices or memory 102 operatively coupled to the processor (s) 104. The processor (s), alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports is configured to crawl external information from external sources 110. The external sources 110 may include sources providing information present as official government websites, university websites, FAQs, Forums, Resolution Agreements, Press release of settlement cases and judgments that provide information associated with the regulation documents or regulation texts. The relevant external information is then extracted from the crawled external information and is used for disambiguation of a plurality of regulation sentences in the regulatory documents.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment the memory 102, may store a NN model. Further, the memory 102 can include a database 108 that may store all the required regulatory documents, internal information providing information on the regulatory documents with different aspects such as an amendment, an applicability, a definition and a reference, which is essential to understand a regulation completely. Further, the database 108 may include training data for the NN model, which includes the source artifact and the target artifact., In an embodiment, the data base 108 may be external (not shown) to the system 100 and accessed through the I/O interfaces 106. The memory 102 may further comprise information pertaining to input(s)/output(s) of each step performed by the modules 108 of the system 100 and methods of the present disclosure.

FIG. 2 illustrates an exemplary flow diagram of a method 200 for automatically resolving ambiguities in regulations using the system of FIG. 1, in accordance with an embodiment of the present disclosure. In an embodiment, the system 100 comprises one or more data storage devices or the memory 102 operatively coupled to the one or more processors 104 and is configured to store instructions for execution of steps of the method 200 by the one or more processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The method 200, disclosed herein, is applicable for resolving ambiguities for various types of regulatory documents such as General Data Protection Regulation (GDPR), ISO 27001, US Health Insurance Portability and Accountability Act (HIPAA) and the like. Applications of the method 200 are explained in accordance with a use case example from regulations related to health care domain such as the HIPAA and may not be construed as a limitation. An illustration below explains how an ambiguity in a regulation sentence of HIPAA may lead to misinterpretation, which is unintentional. Further explained is how the ambiguity is resolved using the method 200, disclosed herein.

Despite HIPAA setting forth certain requirements for safeguarding a patient's privacy and security, many breaches take place on a regular basis. Upon analysis of published HIPAA case studies to understand the reasons behind such breaches or violations of the HIPAA regulations, it is observed that the HIPAA breach is either due to an accidental misuse or a malicious misuse. Malicious misuses correspond to outsider attacks and is intentional, whereas accidental misuses correspond to insider attacks, which is unintentional, often due to human errors. Further, study conducted on the reasons for accidental misuse reveals that reasons for accidental misuse of HIPAA clauses is due to lack of employee training, poorly implemented physical, technical and administrative safeguards and limited understanding of consent and authorization based HIPAA regulations. Focusing on the accidental misuse, method 200 provides solution for resolving ambiguities that arise due to limited understanding of consent and authorization based regulations by providing additional information for better and clear interpretation of the clauses by a reader or user. Potentially, the method reduces unintentional violations or misuse of regulation and attempts to eliminate them providing enhanced compliance management by an organization.

Thus, as observed in studies, accidental violations could be attributed to the ambiguous nature of regulations. As understood from researches that have been carried out in this context, ambiguity arises when a sentence is missing relevant information or when a word or phrase has more than one possible interpretation. For instance, consider the following example for access related breach:

In 2010, Triple-S Management Corporation (TSMC) reported to OCR that it discovered that two of its former workforce members currently employed by a competitor improperly accessed restricted areas of TSMC's proprietary internet IPA database. They were able to gain access to the database because their access rights were not terminated upon leaving the employment of TSMC. The electronic Protected Health Information (ePHI) accessed in the database included members' names, contract numbers, home addresses, diagnostic codes and treatment codes. TSMC had to pay $3.5 Million and as corrective action plan was asked to adopt a robust plan to correct deficiencies in its HIPAA compliance program. The corresponding HIPAA clause on Access Control (§ 164.308(a)(4)) states: "Implement technical policies and procedures for electronic information systems that maintain ePHI to allow access only to those persons or software programs that have been granted access rights." However, the term "access" in this clause and the sub clauses therein is ambiguous.

An online document from the National Institute of Standards and Technology (NIST) [7] in its Introductory Resource Guide for Implementing HIPAA Security Rule states the following for establishing termination procedure: "Implement procedures for terminating access to ePHI when the employment of a workforce member ends or as required by determinations made as specified in § 164.308(a)(3)(ii) (B). Develop a standard set of procedures that should be followed to recover access control devices (Identification [ID] badges, keys, access cards, etc.) when employment ends. Deactivate computer access accounts (e.g., disable user IDs and passwords)."

Had this additional information source been taken into account, this breach could have been avoided. Human beings usually look at multiple sources to make sense of texts that challenge their comprehension. The manual disambiguation is a cumulative outcome of the integration of knowledge from multiple sources such as official government websites, university websites, FAQs, Forums, Press release etc.

Referring to the steps of the method 200, for automatically resolving ambiguities for regulation sentences in regulatory documents, in an embodiment of the present disclosure, at step 202 of the method 200, the processor(s) 104 is configured to receive a regulation sentence. Any regulation sentence, for which disambiguation is needed can be fed as input to the system 100. Referring back to the steps, at step 204, in an embodiment of the present disclosure, the processor(s) 104 is configured to extract the relevant internal information related to the regulation sentence by analyzing a regulatory document corresponding to the regulation sentence in accordance with the set of predefined linguistic patterns. The predefined linguistic patterns are generated for the plurality of aspects of the regulation document including the amendment, the applicability, the definition and the reference. For extracting internal information, plurality of regulation documents related to regulations such as HIPAA, GDPR may be accessed from the database 108. The internal information related to the regulatory documents can also be stored in the database 108. The internal information comprises information in four aspects providing four types that is essential to understand a regulation or regulation sentence completely: The four aspects or types include:

The amendment: This includes the information related to modifications or updates that need to be considered for interpreting a regulation within a given context.

The applicability: This includes information that mentions the criteria or scope and time when the regulation comes into effect.

The definition: This includes the information that explains the meaning of a term or phrase used in regulations.

The reference: This includes the information that directs reader to the sources of additional information such as other paragraphs within the document.

To automatically detect the internal relevant information pertinent to a given regulation sentence (alternatively referred as regulation or regulation sentence), linguistic patterns can be created using a combination of Parts of Speech (POS) tags, keywords and wild card characters, upon manually analyzing the three major clauses in corresponding regulatory document. Say, for example HIPAA security standard mentioned in section 2. In an embodiment implementation of the system 100, a total of 11 such patterns are created, which include 3 of types definitions, 1 of type amendment, and 7 of types of references. The applicability is present as a separate subsection, hence is directly mapped to the regulation sentence under consideration with its corresponding applicability subsection.

Referring to the steps, at step 206, in an embodiment of the present disclosure, the processors (s) 104 is configured to extract relevant external information related to the regulation sentence from the external information. The external information can be crawled from various external sources 110. The external information may include information present as official government websites, university websites, FAQs, Forums, Resolution Agreements, Press release of settlement cases and judgments that provide information associated with the regulation sentences. The processor 104 uses the NN model to identify the external relevant information. This NN model is trained using the source artifact comprising regulation sentences of the plurality of regulatory documents and the target artifact comprising the external information crawled from the external sources 110. The relevancy of the information is accessed by the NN model based on a similarity score threshold preset for assessing the relevancy of each sentence of the external information with the regulation sentence under consideration.

Training method of the NN model disclosed by the method 200 provides binary traceability. The NN model links an ambiguity in the regulatory sentences to information in an external source, such as a policy document, which advises how the regulation may be implemented and vice versa. For example, a term such as "relative" in regulation would be linked (traced) to spouse and children in the policy document, thereby explicating exactly what is meant by the vague, ambiguous term "relative". Thus a person interpreting a regulatory sentence from HIPAA will then know that only spouse and children may receive patients' information and cousins do not come under the umbrella of relatives. Similarly, instances of relatives found in the policy document would also be linked (traced) back to the ambiguous term "relative" in the regulatory document. For example a policy may say, "Parents can also request for health information". When this term is traced to "relative" the person knows that the regulation allows for an additional relative. Therefore, the NN model disclosed provides two way or binary traceability. Thus, using the binary traceability approach the NN models enables to determine possible links between the source and target, thereby disambiguating the regulation sentence. The binary traceability approach is necessary because regulation sentences are kept at an abstract level to cover all possible scenarios and the policies are intended for operationalizing/implementing regulations (regulatory documents). The policies are more specific and therefore help with disambiguation. Other documents which help with disambiguation are expert forums which discuss regulations, court precedents, and the like. The target artifacts cover information gathered from all these external sources to which regulatory documents must be traced to and fro automatically and is performed by the NN model with binary traceability approach.

The training process of the NN model includes a plurality of sub steps explained below.

At first step of the training, the processor 104 is configured to generate training data comprising the source artifact and the target artifact. The generation of the source artifact and the target artifact comprises collecting the regulation sentences from the plurality of regulatory documents and the external information. Thus, the NN model is trained for all available regulatory documents or regulatory standards such as the HIPAA, GDPA and the like. The external information related to all the regulatory documents or standards is crawled from the plurality of external sources 110. The external information refers to one or more sentences related to the plurality of regulatory documents.

For example, HIPAA related data can be collected from various online sources such as websites, discussion forums, blogs, audit sites, and court settlements. The data can be in different file formats such as pdf, docx, doc, and scanned images. This entire data collected from the regulatory documents as well as crawled from external sources 110 needs to be converted into raw text form. Thus, the regulation sentences and the plurality of sentences in the external information are preprocessed to generate a preprocessed data in a standard format.

Once the data is available in standard format, at second step of the training, the processor 104 is configured to segregate the preprocessed data into the source artifact comprising regulation sentences and the target artifacts comprising sentences from the external information. Further at a third step of training, the processor 104 is configured to map each term present in each sentence of the source artifact and the target artifact to a corresponding vector form based on semantic position of each term in the source artifact and the target artifact. The mapping is performed utilizing NN based Word Embedding technique. Further at fourth step of training, the processor 104 is configured to convert each sentence comprising terms in the vector form of the source artifact and the target artifact into a single vector of fixed length by utilizing the NN model. Further at fifth step of training, the processor 104 is configured to calculate the similarity score between each single vector associated with the source artifact and with each single vector associated with the target artifact. The similarity score is computed using a cosine similarity technique. Furthermore at sixth step of training, the processor 104 is configured to augment the regulation sentence associated with each single vector of source artifact with text corresponding to one or more single vectors associated with the target artifact if the similarity score between vector form of the source artifact and vector form of the target artifact is above the similarity score threshold.

Upon extraction of the relevant external information using the NN model and extraction of the relevant internal information using the set of predefined linguistic patterns, at step 208 of the method 200, the processor 104 is configured to summarize the external additional information using an information summarization technique, for example a LexRank approach. At step 210 of the method 200 the processor 104 is configured to generate an augmented text for the regulation sentence to resolve the ambiguity associated with the regulation sentence. The augmented text comprises the regulation sentence, the relevant internal information and the summarized relevant external additional information. The augmented text, as provided in example of table 1 below enables the end user to make an informed interpretation of the regulation sentence, wherein the regulation sentence is from HIPAA.

TABLE 1

| Regulation sentence | Relevant Internal information | Summarized Relevant External information |
|---|---|---|
| Encryption and decryption. Implement a mechanism to encrypt and decrypt ePHI | Definition of encryption as mentioned in the HIPAA Security Standards section. | Possible scenarios of use of encryption and decryption, such as transmission over network, storage, and sending an email containing ePHI. Required possible technical details. Mechanism details for storing the Cryptographic keys. Settlement or court cases regarding HIPAA violation due to lack of encryption |

Explained below is the training of the NN model with an example training process. The training is divided in two phases:

Training Phase: In this phase, the NN model is trained to identify external relevant information. For this purpose 45% of the dataset is used.
 1. NN based Word Embedding technique such as Word2Vec is used to map each term present in the complete dataset, to their corresponding vector form in vector space based on their semantic position in the dataset.
 2. Further, a single RNN that takes as input vector form of terms (based on Word2Vec model) sequentially for a given sentence and gives a single vector of fixed length as output. The RNN is used on sentences of source artifacts and target artifacts to produce a vector output of fixed length for both source artifacts and target artifacts.
 3. The similarity score between the two vectors is calculated Using Cosine Similarity. If the score crosses a desired threshold then it is considered that the sentences in target artifact are relevant to source artifact. The desired threshold is selected as 0.65, where highest value of F-score is achieved. To train the NN model a negative log likelihood as a loss function is to be minimized. Based on this function, a stochastic gradient descent method is used to update the RNN parameters. The learning rate, number of epocs and other parameters in gradient descent method are tuned to optimally train the model.
 4. Testing and Validation Phase: The trained model is run on the remaining 10% dataset for validation and 45% dataset for testing as follows:
  a. Word2Vec model is used to get the semantic vector values for each term in a given input sentence.
  b. Then these word vectors were given sequentially as input to RNN.
  c. The output of RNN, a single fixed length vector, is obtained for source artifact as well as for target artifact.
  d. The similarity between the vectors was calculated using Cosine Similarity. If the score crossed a desired threshold then the sentences in target artifact are considered as relevant to source artifact.

Result and Discussions. The NN is run for different variants of Word2Vec and RNN and it is observed that Skip-gram variant of Word2Vec and Bi-GRU variant of RNN gives best results. A precision to about 22% on recall of 60% is obtained. This is based on the true links obtained from various online sources such as website of New York University, where they have provided their policies and procedures corresponding to HIPAA regulations.

The method disclosed, can provide enhancement by using of state—of—art Transfer Learning in enhancing Word2Vec model and use of Siamese architecture as an alternative to a single RNN of the NN model. Further, the training data (dataset) can be made bigger and more balanced by developing a semantic crawler based on enhanced Word2Vec model.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method to resolve ambiguities in regulatory documents, the method comprising:
   receiving, by the processor, a regulation sentence corresponding to a regulatory document among a plurality of regulatory documents (202);
   extracting, by the processor, relevant internal information related to the regulation sentence by analyzing the regulatory document in accordance with a set of predefined linguistic patterns (204), wherein the predefined linguistic patterns are generated for a plurality of aspects of the regulation document comprising an amendment, an applicability, a definition and a reference, and wherein the predefined linguistic patterns are generated upon analyzing the amendment, applicability, definition and reference of the regulation document;
   extracting, by the processor, relevant external information related to the regulation sentence from external information using a Neural Network (NN) model (206) to provide binary traceability, wherein the NN model is trained using a source artifact comprising regulation sentences in the plurality of regulatory documents and a target artifact comprising the external information, wherein relevancy of the external information with the regulation sentence is accessed by the NN model based on a similarity score threshold;
   summarizing, by the processor, the relevant external information using an information summarization technique (208); and
   generating, by the processor, an augmented text for the regulation sentence to resolve ambiguity associated with the regulation sentence (210), wherein the augmented text comprises the regulation sentence, the relevant internal information and the summarized relevant external information, wherein the augmented text enables end user to make an informed interpretation of the regulation sentence and thereby resolve ambiguity present in the regulation sentence.

2. The method of claim 1, wherein training the NN model comprises:
   generating the source artifact and the target artifact for training the NN model, wherein generating the source artifact and the target artifact comprises:
      collecting the regulation sentences from the plurality of regulatory documents and the external information, wherein the external information crawled from a plurality of external sources comprises plurality of sentences related to the plurality of regulatory documents;
      preprocessing the regulation sentences and the plurality of sentences in the external information to generate a preprocessed data in a standard format; and
      segregating the preprocessed data into the source artifact comprising regulation sentences and the target artifact comprising the plurality of sentences from the external information;
   mapping each term present in each sentence of the source artifact and the target artifact to a corresponding vector form of the sentence based on a semantic position of each term in the source artifact and the target artifact, wherein the mapping is performed by the NN model using an NN based Word Embedding technique;
   converting each sentence comprising terms in the corresponding vector form of the source artifact and the corresponding vector form of the target artifact into a single vector of fixed length by utilizing the NN model;
   calculating a similarity score between each single vector associated with the source artifact and each single vector associated with the target artifact using a cosine similarity technique; and
   augmenting the regulation sentence associated with each single vector of source artifact with text corresponding to one or more single vectors associated with the target artifact if the similarity score between vector form of the source artifact and vector form of the target artifact is above the similarity score threshold.

3. The method of claim 1, wherein training the NN model is an iterative process, wherein the source artifact and the target artifact are updated continuously with changes and additions to the plurality of regulatory documents and the external information crawled from the plurality of external sources.

4. A system (100) for resolving ambiguities in regulatory documents, the system (100) comprising:
a memory (102) storing instructions;
one or more Input/Output (I/O) interfaces (106);
and a processor (104) coupled to the memory (102) via the one or more I/O interfaces (106), wherein the processor (104) is configured by the instructions to:
receive a regulation sentence corresponding to a regulatory document among a plurality of regulatory documents;
extract relevant internal information related to the regulation sentence by analyzing the regulatory document in accordance with a set of predefined linguistic patterns, wherein the predefined linguistic patterns are generated for a plurality of aspects of the regulation document comprising an amendment, an applicability, a definition and a reference, and wherein the predefined linguistic patterns are generated upon analyzing the amendment, applicability, definition and reference of the regulation document;
extract relevant external information related to the regulation sentence from external information using a Neural Network (NN) model to provide binary traceability, wherein the NN model is trained using a source artifact comprising regulation sentences in the plurality of regulatory documents and a target artifact comprising the external information, wherein relevancy of the external information with the regulation sentence is accessed by the NN model based on a similarity score threshold;
summarize the relevant external information using an information summarization technique; and
generate an augmented text for the regulation sentence to resolve ambiguity associated with the regulation sentence, wherein the augmented text comprises the regulation sentence, the relevant internal information and the summarized relevant external information, wherein the augmented text enables end user to make an informed interpretation of the regulation sentence and thereby resolve ambiguity present in the regulation sentence.

5. The system (100) of claim 4, wherein the processor (104) is configured to train the NN model by:
generating the source artifact and the target artifact for training the NN model, wherein generating the source artifact and the target artifact comprises:
collecting the regulation sentences from the plurality of regulatory documents and the external information, wherein the external information crawled from a plurality of external sources comprises plurality of sentences related to the plurality of regulatory documents;
preprocessing the regulation sentences and the plurality of sentences in the external information to generate a preprocessed data in a standard format; and
segregating the preprocessed data into the source artifact comprising regulation sentences and the target artifact comprising the plurality of sentences from the external information;
mapping each term present in each sentence of the source artifact and the target artifact to a corresponding vector form of the sentence based on a semantic position of each term in the source artifact and the target artifact, wherein the mapping is performed by the NN model using an NN based Word Embedding technique;
converting each sentence comprising terms in the corresponding vector form of the source artifact and the corresponding vector form of the target artifact into a single vector of fixed length by utilizing the NN model;
calculating a similarity score between each single vector associated with the source artifact and with each single vector associated with the target artifact using a cosine similarity technique; and
augmenting the regulation sentence associated with each single vector of source artifact with text corresponding to one or more single vectors associated with the target artifact if the similarity score between vector form of the source artifact and vector form of the target artifact is above the similarity score threshold.

6. The system (100) of claim 4, wherein the processor (104) is configured to train the NN model by an iterative process, wherein the source artifact and the target artifact are updated continuously with changes and additions to the plurality of regulatory documents and the external information crawled from the plurality of external sources.

7. One or more non-transitory machine readable information storage mediums comprising one or more instructions which when executed by one or more hardware processors causes:
receiving a regulation sentence corresponding to a regulatory document among a plurality of regulatory documents;
extracting relevant internal information related to the regulation sentence by analyzing the regulatory document in accordance with a set of predefined linguistic patterns, wherein the predefined linguistic patterns are generated using the plurality of aspects of the regulation document comprising an amendment, an applicability, a definition and a reference, and wherein the predefined linguistic patterns are generated upon analyzing the amendment, applicability, definition and reference of the regulation document;
extracting relevant external information related to the regulation sentence from external information using a Neural Network (NN) model to provide binary traceability, wherein the NN model is trained using a source artifact comprising regulation sentences in a plurality of regulatory documents and a target artifact comprising the external information, wherein relevancy of the external information with the regulation sentence is accessed by the NN model based on a similarity score threshold;
summarizing the relevant external information using an information summarization technique; and
generating an augmented text for the regulation sentence to resolve ambiguity associated with the regulation sentence, wherein the augmented text comprises the regulation sentence, the relevant internal information and the summarized relevant external information, wherein the augmented text enables end user to make an informed interpretation of the regulation sentence and thereby resolve ambiguity present in the regulation sentence.

8. The one or more non-transitory machine readable information storage mediums of claim 7 comprising one or more instructions which when executed by one or more hardware processors causes, training the NN model by:
generating the source artifact and the target artifact for training the NN model, wherein generating the source artifact and the target artifact comprises:

collecting the regulation sentences from the plurality of regulatory documents and the external information, wherein the external information crawled from a plurality of external sources comprises plurality of sentences related to the plurality of regulatory documents;

preprocessing the regulation sentences and the plurality of sentences in the external information to generate a preprocessed data in a standard format; and segregating the preprocessed data into the source artifact comprising regulation sentences and the target artifact comprising the plurality of sentences from the external information;

mapping each term present in each sentence of the source artifact and the target artifact to a corresponding vector form of the sentence based on a semantic position of each term in the source artifact and the target artifact, wherein the mapping is performed by the NN model using an NN based Word Embedding technique;

converting each sentence comprising terms in the corresponding vector form of the source artifact and the corresponding vector form of the target artifact into a single vector of fixed length by utilizing the NN model;

calculating a similarity score between each single vector associated with the source artifact and with each single vector associated with the target artifact using a cosine similarity technique; and augmenting the regulation sentence associated with each single vector of source artifact with text corresponding to one or more single vectors associated with the target artifact if the similarity score between vector form of the source artifact and vector form of the target artifact is above the similarity score threshold.

9. The one or more non-transitory machine readable information storage mediums of claim 7 comprising one or more instructions which when executed by one or more hardware processors further causes, updating, the source artifact and the target artifact, continuously with changes and additions to the plurality of regulatory documents and the external information crawled from the plurality of external sources.

* * * * *